July 1, 1930.  J. PETERS  1,769,890
MIXING AND COOLING APPARATUS
Filed May 29, 1929  3 Sheets-Sheet 2

INVENTOR
James Peters
BY
Frank A. Kent
ATTORNEY

July 1, 1930.    J. PETERS    1,769,890
MIXING AND COOLING APPARATUS
Filed May 29, 1929    3 Sheets-Sheet 3

Patented July 1, 1930

1,769,890

UNITED STATES PATENT OFFICE

JAMES PETERS, OF ROSYLN HEIGHTS, NEW YORK, ASSIGNOR TO THE TURBO-MIXER CORPORATION, OF NEW YORK, N. Y., A CORPORATION OF NEW YORK

MIXING AND COOLING APPARATUS

Application filed May 29, 1929. Serial No. 366,922.

My invention relates to mixing and cooling apparatus which is especially valuable for the mixing of beverages or beverage materials, such, for example, as malted milk, and especially when such materials require to be chilled during mixing; although in the broader aspect of the invention there is no necessary limitation as to the uses of the apparatus.

A general object of the invention is to provide a mix-tank suitable for the above indicated or other purposes, a cooling tank, and means or arrangements by which the mix-tank is easily placed and centered in the cooling tank and removed therefrom; to also provide suitable liquid circulating or mixing apparatus in the mix-tank and to make such apparatus easily removable and replaceable; preferably to support the cooling tank with the mix-tank therein in an outer shell or housing in such manner that the cooling tank is easily removable from and replaceable in the housing; and preferably further to provide driving means such as a motor and gearing in a lower compartment provided by the lower portion of the housing, below the bottom of the cooling tank, with means for readily connecting and disconnecting the motor to the mixing apparatus; and by the stated structure or arrangement of parts to provide efficient mixing and cooling apparatus for indicated purposes, and at the same time to greatly facilitate the cleaning of all parts of the apparatus, which is a prime desideratum, especially in the handling of beverage mixtures.

The invention also includes various improved features of structure and arrangement in apparatus of this class, as will appear.

The characteristics and advantages of the invention are further sufficiently explained in connection with the following detail description of the accompanying drawings, which show one representative embodiment. After considering this example, skilled persons will understand that many variations may be made without departing from the principles disclosed, and I contemplate the employment of any structures that are properly within the scope of the appended claims.

Figure 1:
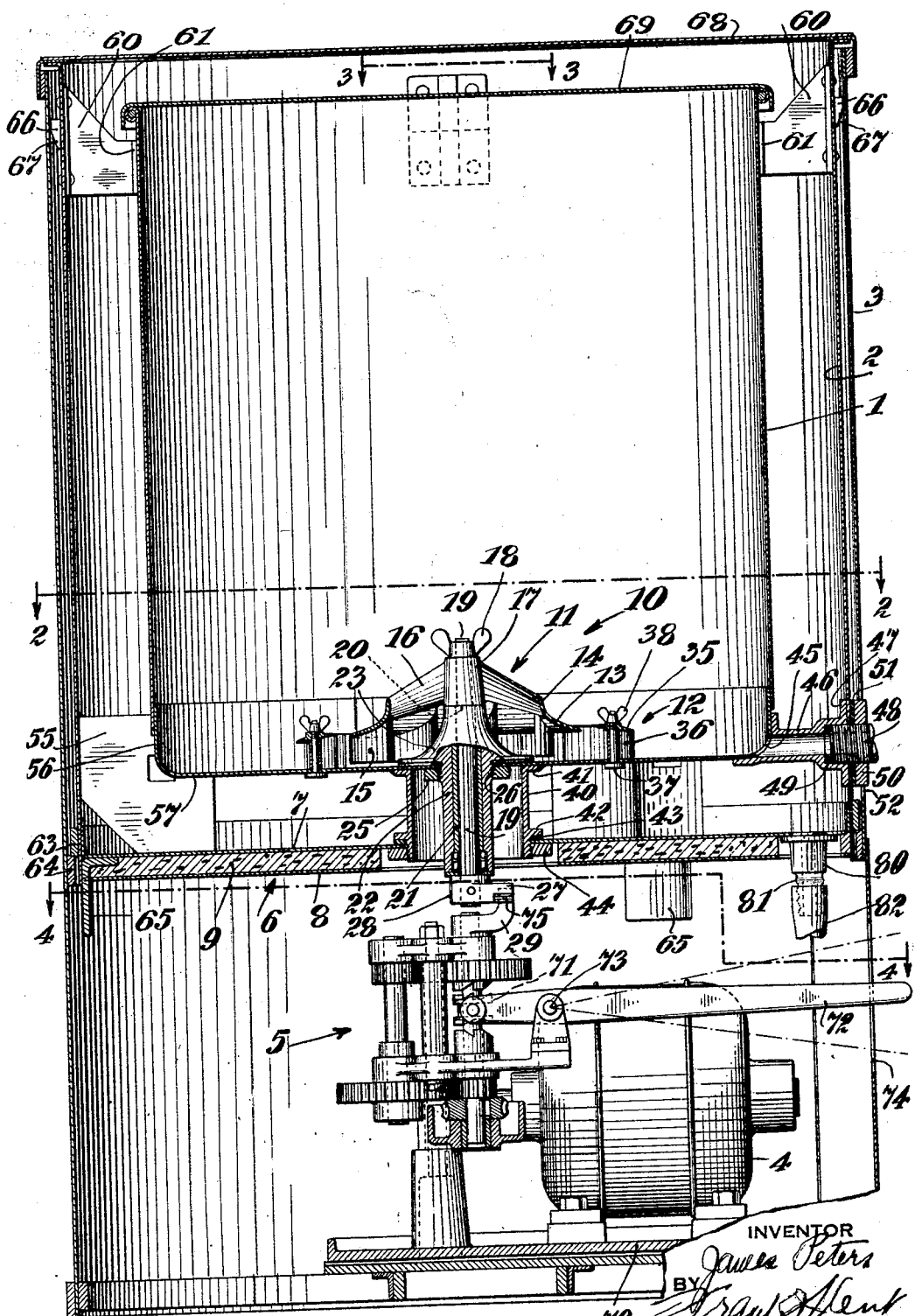
Fig. 1 is a vertical section of apparatus embodying the invention in one form.
Figure 2:
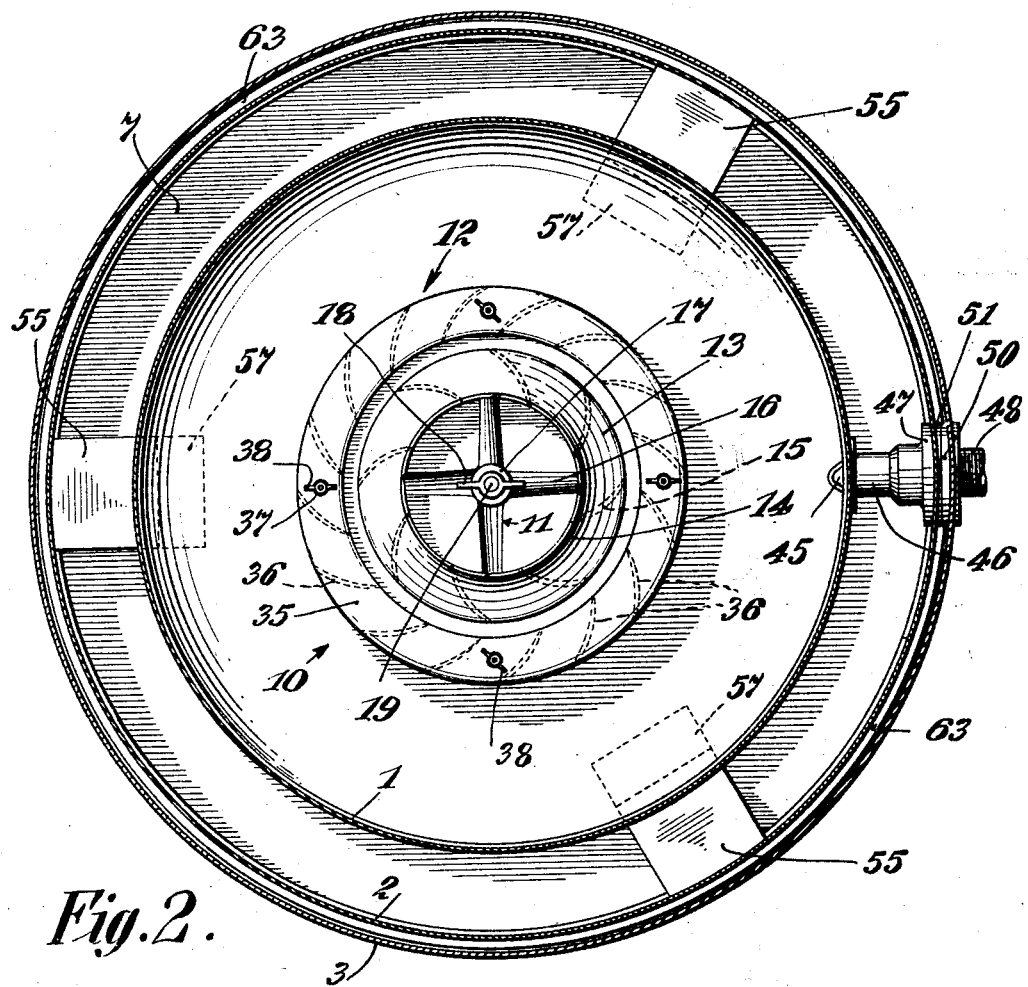
Fig. 2 is a section at 2—2, Fig. 1.
Figure 3:
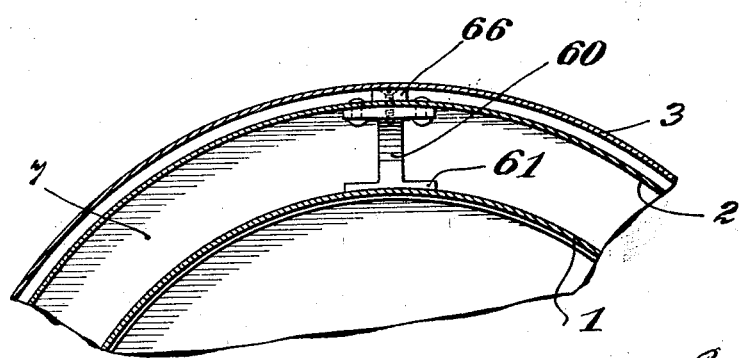
Fig. 3 is a sectional detail, at 3—3, Fig. 1.
Figure 4:
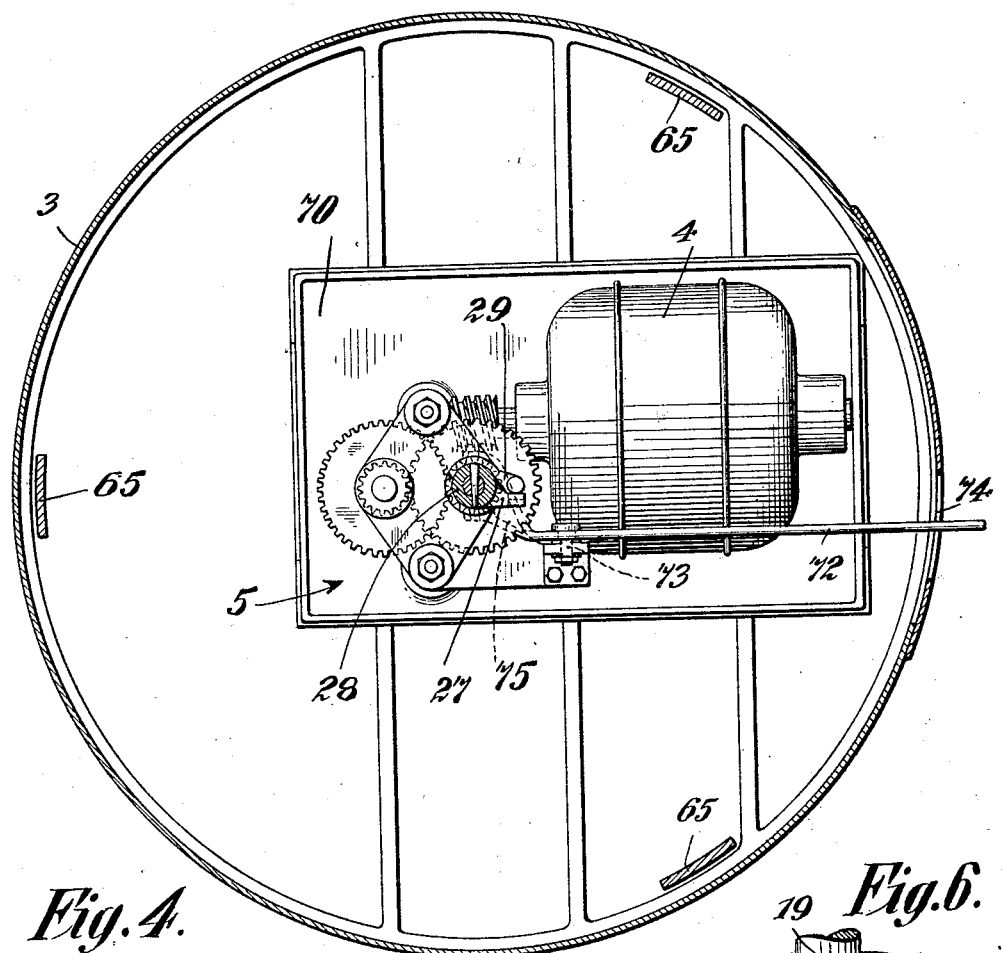
Fig. 4 is a section at 4—4, Fig. 1.

A mix-tank 1 is located within an ice-tank or brine-tank 2, which is in the upper part of an outer shell or housing 3. The tanks and shell are usually cylindrical. A motor 4 and driving gearing 5 are located within the lower part of the shell, which is practically divided into two compartments by the bottom 6 of the ice-tank.

This bottom consists of two spaced walls or plates 7 and 8, the chamber thus provided being packed with cork or other suitable heat-insulating material 9, protecting ice or brine in the ice-tank from heat radiated from the motor.

Mixing or circulating apparatus 10 is located in the mix-tank, preferably at the bottom, as shown, although an upward location may be provided, if desired. In the broader aspect of the invention, the mixing apparatus may be of any known or suitable type. Preferably, however, it is, as shown, of the turbo-impeller type, including an impeller 11 and stationary deflector 12. Details of the impeller and deflector may also vary greatly. Those shown are of a suitable and efficient form for circulating and mixing the materials here contemplated, such as malted milk, for example.

The impeller consists of an annular plate 13 having an upcurved inner margin 14 forming an intake throat, curved and substantially tangential impelling blades 15 depending from the plate, and centripetally acting blades 16 connecting the plate to a hub 17. The hub is detachably connected, preferably by a wing nut 18, on the upper end of a drive shaft 19, and against a shoulder 20 thereon. The shaft runs in a bushing 21 in a bearing sleeve 22, which passes through a hole at the center of the mix-tank bottom. The upper portion of this sleeve, within the tank, is conoidal, to provide for proper liquid flow; the base of this cone, or flange 23 rests on a compressible washer 24 on the tank bottom (Fig. 7); and a detachable liquid tight connection for the sleeve is provided by a nut 25 engaging a sleeve thread 26.

A driving member 27 has its hub 28 primed or keyed to the lower end 8 of the shaft. This member is in the form of an arm adapted for ready connection and disconnection (by the raising or lowering of the mix-tank) with another arm or jaw-member 29 which is the final driven member of suitable drive gearing, as will appear.

Packing is provided for shaft 19, to prevent liquid from the mix-tank leaking past the shaft into the lower compartment. This packing includes the rings 30 of U section, or other suitable compressible packing located in a counterbore 31 in the lower end of sleeve 22, retained in position by washer 32 secured to the lower end of the sleeve as by screws 33. The washer is located between hub 28 of the driver 27 and the sleeve end, and serves to retain the packing in position when the shaft is removed for cleaning, which may be done after the wing nut 18 is taken off and the impeller 11 removed from the upper end of the shaft.

The deflector 12 in the form shown consists of an annular plate 35 and deflecting blades 36 thereon having their lower ends located on the tank bottom. The deflector structure is detachably secured by bolts 37 and wing nuts 38, so that it is easily removed for cleaning. The blades 36 are curved and approximately tangentially arranged so as to receive liquid discharged by the impeller in tangential directions and diverted to radial flow.

A housing sleeve 40 connects the bottom of tank 1 with the bottom of the ice-tank 2, serving to retain ice or brine in the ice-tank and to enclose the impeller driver shaft 19 and its sleeve 22. This housing sleeve has at its upper end a flange 41 secured to the bottom of tank 1 by welding or otherwise. At its lower end the housing sleeve is detachably connected to the bottom 6 of tank 2 or specifically to the upper plate 7 of the tank bottom. For this purpose the lower plate 8 is cut away to accommodate the fastening means for the housing sleeve. The sleeve has a flange 42 secured against plate 7 about a hole therein with an interposed gasket 43, and is detachably secured by a nut 44 engaging a threaded end of the sleeve and bearing against the bottom face of plate 7. The nut is accessible through the opening in the bottom plate 8 to disconnect the housing sleeve from the ice-tank when it is desired to separate the mix-tank therefrom.

The mix-tank has at the bottom at one side a discharge port 45 leading to the bore of a pipe fitting 46 secured to tank 1 by welding or otherwise. The outer end of this pipe fitting has a flange 47 engaging the inner face of the side wall of the ice tank 2. The threaded end 48 of a discharge pipe or dispensing tube passes through a hole in tank 2 and is screwed into the end of pipe fitting 46 against a gasket 49. The liquid tight connection to the wall tank 2 is completed by nut 50 screwed on the threaded pipe member 48, and a gasket 51 between the nut and the tank wall. The outer casing or shell 3 is apertured as at 52 to accommodate the discharge connection as 48 and its nut 50.

In addition to its connection to tank 2 by the pipe fitting 46 as just described, the mix-tank is properly centered in the ice-tank by means which provides at the same time for the easy removal of the mix-tank from the ice-tank and replacement therein. Such means includes lower and upper centering devices. The lower centering devices are in the form of chairs 55 uniformly placed, and three or more in number, and secured to the side and bottom walls of the ice-tank by welding or otherwise. These chairs have vertical faces 56 to engage side wall formations of the mix-tank and horizontal faces 57 to engage the tank bottom and thus support and center the tank. The upper centering devices consist of brackets 60, three or more in number, uniformly spaced and secured to the wall of tank 2 by riveting or otherwise, and having segmental faces 61 fitting the side wall of tank 1 to center to the upper portion of the mix-tank in the ice-tank.

Provision is also made for removably supporting and centering the ice-tank within the outer housing or shell 3. A ring 63 is secured to the wall of tank 2 near the bottom thereof, by welding or otherwise, and rests on a ring 64 similarly secured to shell 3. The bottom of the ice-tank is provided with three or more uniformly spaced depending plates or flanges 65 which aid in guiding the ice-tank to proper position as it is lowered into the shell until it is supported therein by ring 63 resting on ring 64. Near its upper end tank wall 2 has lugs 66 engaging shell 3 to center the upper portion of the ice-tank therein. The lower edges of these lugs are pivoted as at 67 to facilitate the entry into the upper end of the shell. The ice-tank has a removable flanged cover 68 and the mix-tank has a removable flanged cover 69.

The motor 4 is secured to a base plate 70 which in turn is located or secured in any convenient way in the lower part of shell 3. The motor may be connected in any suitable way to impeller shaft 19. Such connection usually includes reduction gearing and may desirably be as shown, in the form of change speed gearing 5, the details of which are not claimed as a part of the invention. The gearing desirably includes a double, shiftable jaw clutch 71 by which the motor may be connected to the final driven member 29 at relatively high and low gear ratios. The clutch is shifted by lever 72 fulcrumed at 73 on a bracket connected to the motor housing. The handle end of the lever is accessible through a hole 74 in shell 3. The final driven member 29 of the change speed gearing is at the front of an arm or jaw readily engageable and disengageable with arm 27 connected to the impeller shaft as above mentioned. To facilitate the connection of the driving and driven members, arm 27 may have a beveled face 75.

The ice-tank has a drain connection consisting of a thimble or pipe fitting 80 secured to plate 7 of the tank bottom having an aperture therein and provided with a nipple or other suitable means 81 for connection of a waste pipe, such as the hose 82, to draw off water or brine from the ice or brine tank.

Figures 5, 6, 7:
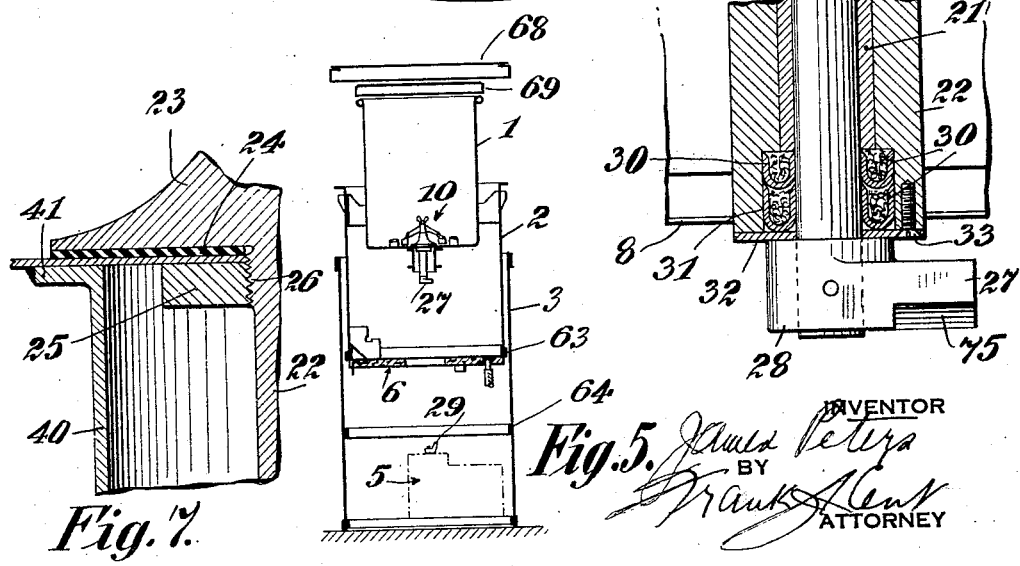
Fig. 5 is a schematic vertical section, showing principal parts in partly-disassembled condition.
Fig. 6 is a sectional detail of the stuffing box and drive connection for the impeller.
Fig. 7 is a sectional detail of the structure connecting the impeller bearing sleeve to the mix-tank bottom.

Fig. 5 graphically explains the mode of separating the mix-tank from the ice-tank and the ice-tank from the shell for cleaning or other purposes. To permit upward removal of the mix-tank from the ice-tank the discharge pipe fitting 46 is fed from tank 2 by removing nut 50 and discharging pipe member 48, and by removing nut 44 which connects the housing sleeve 40 to the bottom of tank 2. The mix-tank then slides easily away from chairs 55 and between the centering faces 61 of brackets 60. The ice-tank is then free for upward removal in an obvious way and in fact it preferably has no positive connection to the shell and may, therefore, be lifted out at any time after the mix-tank discharge fitting is disconnected; or, of course, the ice-tank may be removed while the mix-tank remains in position in it. The tanks are replaced and reconnected in a manner which will be obvious from preceding explanations, which also sufficiently explain the mode of removal of the impeller, its shaft, and the deflector structure, for cleaning or other purposes.

I claim:

1. Mixing and cooling apparatus, comprising a cooling tank, supporting means therefor, a mix-tank supported and centered in the cooling tank for upward removal therefrom, mixing apparatus in the mix-tank, driving means below the cooling tank, and a connection from the driving means to the mixing apparatus.

2. Mixing and cooling apparatus, comprising a cooling tank, supporting means therefor, a mix-tank supported and centered in the cooling tank for upward removal therefrom, mixing apparatus in the mix-tank, driving means below the cooling tank, and a connection from the driving means to the mixing apparatus, said connection being so arranged that it is made operative when the mix-tank is lowered to operative position in the cooling tank and disconnected when the mix-tank is raised away from the cooling tank.

3. Mixing and cooling apparatus, comprising a cooling tank, supporting means therefor, a mix-tank supported and centered in the cooling tank for upward removal therefrom, mixing apparatus in the mix-tank, driving means below the cooling tank, and a connection from the driving means to the mixing apparatus, and a discharge fitting substantially at the bottom of the mix-tank and detachably connected to the wall of the cooling tank.

4. Mixing and cooling apparatus, comprising a cooling tank, supporting means therefor, a mix-tank supported and centered in the cooling tank for upward removal therefrom, mixing apparatus in the mix-tank, driving means below the cooling tank, and a connection from the driving means to the mixing apparatus, the supporting means for the cooling tank including an outer shell, in the lower part of which the driving means is housed.

5. Mixing and cooling apparatus, comprising a cooling tank, supporting means therefor, a mix-tank supported and centered in the cooling tank for upward removal therefrom, mixing apparatus in the mix-tank, driving means below the cooling tank, and a connection from the driving means to the mixing apparatus, the cooling tank having an insulating bottom wall.

6. Mixing and cooling apparatus, comprising a cooling tank, supporting means therefor, a mix-tank supported and centered in the cooling tank for upward removal therefrom, mixing apparatus in the mix-tank, driving means below the cooling tank, and a connection from the driving means to the mixing apparatus, the supporting means for the cooling tank including an outer shell, in the lower part of which the driving means is housed, the cooling tank having in its bottom wall within the shell a drain connection.

7. Mixing and cooling apparatus, comprising a shell, a cooling tank therein, a mix-tank, mixing apparatus in the mix tank, driving means below the cooling tank, a connection from the driving means to the mixing apparatus, means on the cooling tank near its bottom and in the shell respectively for supporting the cooling tank in the shell, and guiding and centering means near the upper end of the cooling tank to center it with the shell, said supporting and centering means being arranged to admit free raising and lowering of the cooling tank to position in the shell.

8. Mixing and cooling apparatus, comprising a shell, a cooling tank therein, a mix-tank, mixing apparatus in the mix-tank, driving means below the cooling tank, a connection from the driving means to the mixing apparatus, means on the cooling tank near its bottom and in the shell respectively for supporting the cooling tank in the shell, guiding and centering means near the upper end of the cooling tank to center it with the shell, said supporting and centering means being arranged to admit free raising and lowering of the cooling tank to position in the shell, and guiding and centering means at the bottom of the cooling tank to support the mix-tank in centered position with its bottom spaced from the bottom of the cooling tank.

9. Mixing and cooling apparatus, comprising a cooling tank, supporting means therefor, a mix-tank supported and centered in the cooling tank for upward removal therefrom, mixing apparatus in the mix-tank, driving means below the cooling tank, and a connection from the driving means to the mixing apparatus, the mixing apparatus comprising a rotor and a shaft therefor removably mounted in a bearing at the center of the mix-tank bottom.

10. Mixing and cooling apparatus, comprising a cooling tank, supporting means therefor, a mix-tank supported and centered in the cooling tank for upward removal therefrom, mixing apparatus in the mix-tank, driving means below the cooling tank, and a connection from the driving means to the mixing apparatus, the mixing apparatus comprising a rotor and a shaft therefor removably mounted in a bearing at the center of the mix-tank bottom, and means for quickly connecting the impeller to the upper end of the shaft and disconnecting it.

11. Mixing and cooling apparatus, comprising a cooling tank, supporting means therefor, a mix-tank supported and centered in the cooling tank for upward removal therefrom, mixing apparatus in the mix-tank, driving means below the cooling tank, and a connection from the driving means to the mixing apparatus, the mixing apparatus comprising a rotor and a shaft therefor removably mounted in a bearing at the center of the mix-tank bottom, the shaft being removable after disconnection of the impeller.

12. Mixing and cooling apparatus, comprising a cooling tank, supporting means therefor, a mix-tank supported and centered in the cooling tank for upward removal therefrom, mixing apparatus in the mix-tank, driving means below the cooling tank, and a connection from the driving means to the mixing apparatus, the mixing apparatus comprising a rotor and a shaft therefor removably mounted in a bearing at the center of the mix-tank bottom, and a housing sleeve surrounding the impeller shaft and its bearing, the sleeve being connected to the bottom of the mix-tank and detachably connected to the bottom of the cooling tank.

13. Mixing and cooling apparatus, comprising a cooling tank, supporting means therefor, a mix-tank supported and centered in the cooling tank for upward removal therefrom, mixing apparatus in the mix-tank, driving means below the cooling tank, and a connection from the driving means to the mixing apparatus, the mixing apparatus comprising a rotor and a shaft therefor removably mounted in a bearing at the center of the mix-tank bottom, the bearing for the impeller shaft being in the form of a sleeve having shaft packing therein preventing escape of liquid from the mix-tank through the shaft bearing.

14. Mixing and cooling apparatus, comprising a cooling tank, supporting means therefor, a mix-tank supported and centered in the cooling tank for upward removal therefrom, mixing apparatus in the mix-tank, driving means below the cooling tank, and a connection from the driving means to the mixing apparatus, the mixing apparatus including a rotor, and a stationary deflector surrounding the rotor and detachably secured to the bottom of the mix-tank.

15. A unitary mixing and cooling apparatus, comprising a cooling tank, supporting means therefor, a mix-tank supported and centered in the cooling tank for upward removal therefrom, mixing apparatus in the mix-tank, driving means below the cooling tank, and a connection from the driving means to the mixing apparatus, said driving means including a motor and gearing for connecting the motor to the mixing apparatus.

16. A unitary mixing and cooling apparatus, comprising a cooling tank, supporting means therefor, a mix-tank supported and centered in the cooling tank for upward removal therefrom, mixing apparatus in the mix-tank, driving means below the cooling tank, and a connection from the driving means to the mixing apparatus, said driving means including a motor and change speed gearing for connecting the motor to the mixing apparatus.

17. Mixing and cooling apparatus, comprising a cooling tank, supporting means therefor, a mix-tank supported and centered in the cooling tank for upward removal therefrom, mixing apparatus in the mix-tank, driving means below the cooling tank, and a connection from the driving means to the mixing apparatus, said driving means including a motor and gearing for connecting the motor to the mixing apparatus, the gearing including a final driven member and the mixing apparatus having a driving member readily engageable and disengageable with said final driven member of the gearing.

18. In apparatus of the class described, an outer shell, a cooling tank therein and upwardly removable, the shell and tank having coacting supporting devices, a mix-tank within the cooling tank and upwardly removable, supporting and centering means in the cooling tank for the bottom of the mix-tank, a housing sleeve connecting the bottom of the mix-tank to the bottom of the cooling tank at the centers thereof, a bearing sleeve passing through the housing sleeve, a drive shaft passing through the bearing sleeve, mixing apparatus in the mix-tank comprising a rotary impeller connected to the upper end of the shaft and a stationary deflector about the impeller, and driving mechanism within the shell below the cooling tank and including a member engaged with the shaft for driving the same.

19. In apparatus of the class described, an outer shell, a cooling tank therein and upwardly removable, the bottom of the cooling tank being provided with heat insulation, the shell and tank having coacting supporting devices, a mix-tank within the cooling tank and upwardly removable, supporting and centering means in the cooling tank for the bottom of the mix-tank, a housing sleeve connecting the bottom of the mix-tank to the bottom of the cooling tank at the centers thereof, a bearing sleeve passing through the housing sleeve, a drive shaft passing through the bearing sleeve, mixing apparatus in the mix-tank comprising a rotary impeller connected to the shaft, and driving mechanism within the shell below the cooling tank and including a member engaged with the shaft for driving the same.

20. In apparatus of the class described, an outer shell, a cooling tank therein and upwardly removable, the bottom of the cooling tank being double-walled and having heat insulation between the walls, the shell and tank having coacting supporting devices, a mix-tank within the cooling tank and upwardly removable, supporting and centering means in the cooling tank for the bottom of the mix-tank, a housing sleeve connecting the bottom of the mix-tank to the bottom of the cooling tank at the centers thereof, a bearing sleeve passing through the housing sleeve, a drive shaft passing through the bearing sleeve, mixing apparatus in the mix-tank comprising a rotary impeller connected to the upper end of the shaft and a stationary deflector about the impeller, and driving mechanism within the shell below the cooling tank and including a member engaged with the shaft for driving the same.

21. The structure defined in claim 18, with the addition that the housing sleeve is detachably connected to the bottom of the cooling tank.

22. The structure defined in claim 18, with the addition that the bearing sleeve has at an upper location within the mix-tank a conoidal formation for directing material flow.

23. The structure defined in claim 18, with the addition that the bearing sleeve has at an upper location within the mix-tank a conoidal formation for directing material flow, said conoidal formation terminating in a flange overlying the bottom of the mix-tank, and the bearing sleeve having a nut detachably clamping the flange against the tank bottom.

24. The structure defined in claim 18, with the addition of quickly operable means detachably connecting the impeller to the upper end of the shaft.

25. The structure defined in claim 18, with the addition of quickly operable means detachably connecting the deflector structure to the bottom of the mix-tank.

26. The structure defined in claim 18, with the addition of a discharge fitting leading from a port at the bottom of the mix-tank to an aperture in the side wall of the cooling tank, a discharge pipe screwed into the fitting, and a nut on the discharge pipe and acting against the outer face of the cooling tank.

27. The structure defined in claim 18, with the addition that the driving mechanism includes a motor and change-speed gearing.

28. In apparatus of the class described, an outer shell, a cooling tank therein and upwardly removable, the shell and tank having coacting supporting devices, a mix-tank within the cooling tank and upwardly removable, supporting and centering chairs in the cooling tank for the bottom of the mix-tank, centering means between the cooling tank and mix-tank at an upward location, a housing sleeve connecting the bottom of the mix-tank to the bottom of the cooling tank at the centers thereof, a bearing sleeve passing through the housing sleeve, a drive shaft passing through the bearing sleeve, mixing apparatus in the mix-tank comprising a rotary impeller connected to the upper end of the shaft and a stationary deflector about the impeller, and driving mechanism within the shell below the cooling tank and including a member engageable with the lower end of the shaft for driving the same.

29. In apparatus of the class described, an outer shell, a cooling tank therein and upwardly removable, the bottom of the cooling tank being provided with heat insulation, the shell and tank having coacting supporting devices, a mix-tank within the cooling tank and upwardly removable, supporting and centering chairs in the cooling tank for the bottom of the mix-tank, centering means between the cooling tank and mix-tank at an upward location, a housing sleeve connecting the bottom of the mix-tank to the bottom of the cooling tank at the centers thereof, a bearing sleeve passing through the housing sleeve, a drive shaft passing through the bearing sleeve, mixing apparatus in the mix-tank comprising a rotary impeller connected to the upper end of the shaft and a stationary deflector about the impeller, and driving mechanism within the shell below the cooling tank and including a member engageable with the lower end of the shaft for driving the same.

30. In apparatus of the class described, an outer shell, a cooling tank therein and upwardly removable, the bottom of the cooling tank being double-walled and having heat insulation between the walls, the shell and tank having coacting supporting devices, a mix-tank within the cooling tank and upwardly removable, supporting and centering chairs in the cooling tank for the bottom of the mix-tank, centering means between the cooling tank and mix-tank at an upward location, a housing sleeve connecting the bottom of the mix-tank to the bottom of the cooling tank at the centers thereof, a bearing sleeve passing through the housing sleeve, a drive shaft passing through the bearing sleeve, mixing apparatus in the mix-tank comprising a rotary impeller connected to the upper end of the shaft and a stationary deflector about the impeller, and driving mechanism within the shell below the cooling tank and including a member engageable with the lower end of the shaft for driving the same.

31. The structure defined in claim 28, with the addition that the housing sleeve is detachably connected to the bottom of the cooling tank.

32. The structure defined in claim 28, with the addition that the bearing sleeve has at an upper location within the mix-tank a conoidal formation for directing material flow.

33. The structure defined in claim 28, with the addition that the bearing sleeve has at an upper location within the mix-tank a conoidal formation for directing material flow, said conoidal formation terminating in a flange overlying the bottom of the mix-tank, and the bearing sleeve having a nut detachably clamping the flange against the tank bottom.

34. The structure defined in claim 28, with the addition of quickly operable means detachably connecting the impeller to the upper end of the shaft.

35. The structure defined in claim 28, with the addition of quickly operable means detachably connecting the deflector structure to the bottom of the mix-tank.

36. The structure defined in claim 28, with the addition of a discharge fitting leading from a port at the bottom of the mix-tank to an aperture in the side wall of the cooling tank, a discharge pipe screwed into the fitting, and a nut on the discharge pipe clamping a washer against outer face of the cooling tank, the shell being apertured to accommodate the discharge pipe and give access to the nut.

37. The structure defined in claim 28, with the addition that the driving mechanism includes a motor and change-speed gearing.

In testimony whereof I affix my signature
JAMES PETERS